ABSTRACT OF THE DISCLOSURE

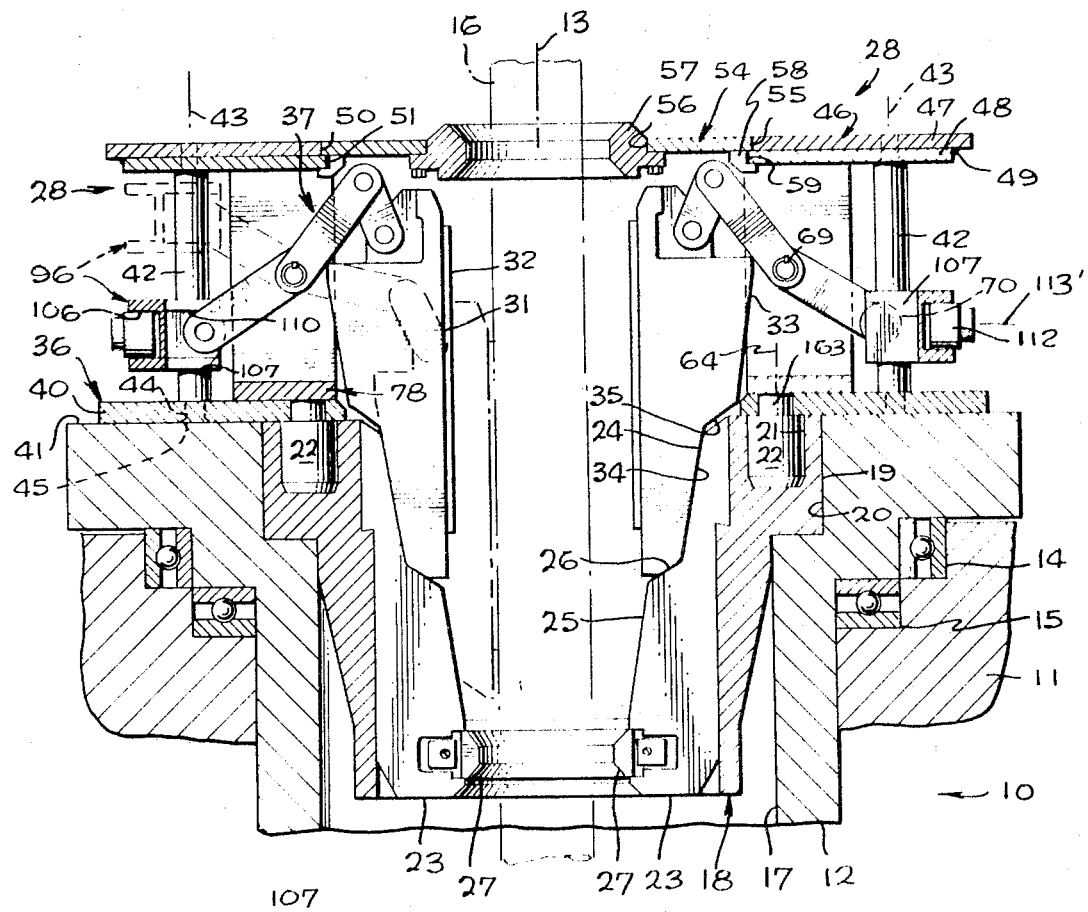
Fig. 4
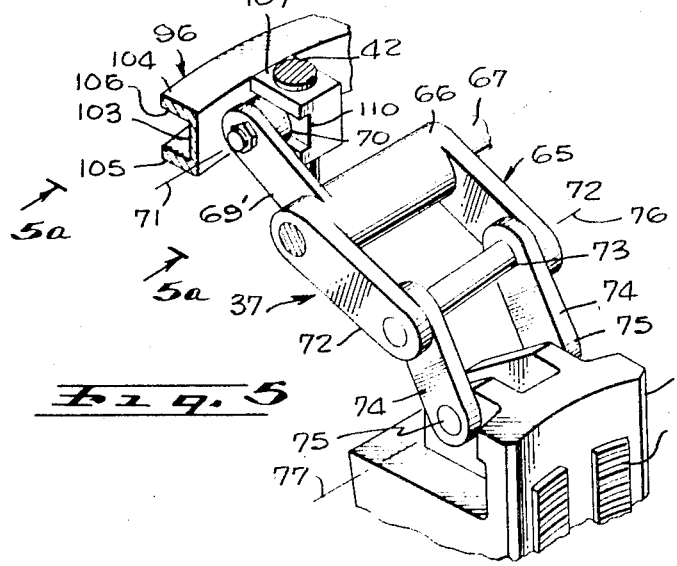
Fig. 5
Fig. 5a
Guy W. Kingsbury
George H. Haby
INVENTORS
By William T. Green
ATTORNEY 3,457,605
POWER SLIP
Guy W. Kingsbury, Long Beach, and George H. Haby, Altadena, Calif., assignors to Abegg and Reinhold Co., Los Angeles, Calif., a corporation of California
Filed Apr. 22, 1968, Ser. No. 722,991
Int. Cl. E21b 3/04
U.S. Cl. 24—263        27 Claims

A power operated slip assembly for supporting a well pipe in a rotary table, and including a body mounted to the rotary table for rotation therewith, a number of pipe grippings slips mounted for upward and downward movement relative to the body, a counterweight ring mounted to turn with the body and connected to the slips in counterweighting relation, and an actuating unit to be mounted at a side of the rotary table and having a yoke engageable with the counterweight ring to actuate it upwardly and downwardly. The slips are interconnected for movement vertically in unison by a series of shafts turning about different horizontal axes and associated with the different slips respectively, and interconnected by an angle drive arrangement for rotation in unison.

Background of the invention

This invention relates to a power slip mechanism for supporting a vertically extending well pipe within a rotary table, and in which the pipe gripping slips are adapted to be power actuated vertically between active pipe gripping positions and upwardly retracted inactive non-gripping positions.

Though various types of power slip devices have been proposed in the past, most of these have had the common disadvantage of occupying an excessive vertical distance above the upper surface of the rotary table, when the power slip is in position for use, and thus preventing movement of the elevator equipment and other equipment, as well as the joints of a pipe being suspended, downwardly into a close proximity to the rotary table as would otherwise be desired. The slip actuating mechanisms employed in most of these prior units have been of such types as to inherently require the occupation by the power slip assembly of a relatively great vertical distance or thickness above the rotary table, in order to allow for the operational portions of the mechanism. Additionally, many of these prior units have had a vertical thickness which has increased and decreased in correspondence with the positions to which the slips were actuated, so that the height of the uppermost portion of the assembly varies in a manner rendering it difficult to predetermine exactly how far downwardly another piece of equipment may be located in order to avoid contact with the slip mechanism in all of its settings.

Some of the most popular of the previously devised power slip units have had the added disadvantage of being incapable of movement into and out of their active position on the rotary table except by stripping the power slip vertically past the end of the suspended pipe. That is, these slip assemblies could not be moved laterally onto and off of the rotary table while a pipe was in position of extension through the table. Also, many of the prior art devices were so constructed as to require an excessive actuating force for displacing the slips vertically between their pipe gripping and non-gripping positions.

Summary of the invention

A power slip assembly constructed in accordance with the present invention is capable of overcoming all of the above discussed disadvantageous of the prior art arrangements, and in addition can be manufactured at relatively low cost, and will function very reliably over a long period of time to provide a very positive and effective support of a gripped pipe. The structure of the unit enables it to assume a fixed vertical height, which does not vary during operation of the apparatus, and which is substantially less than the vertical thickness or height of prior power slip devices. The entire slip assembly may be moved laterally between an active position on the rotary table and an inactive position, even in the presence of a vertically extending pipe in the rotary table, and without requiring axial or vertical stripping of the assembly off of the pipe.

A particular feature of the invention resides in the unique manner in which we minimize the power required to actuate the slips upwardly and downwardly, by providing a counterweight which desirably extends about the pipe as essentially a ring, and which is for best results connected to the remainder of the slip supporting assembly for rotation therewith as the rotary table turns. An actuating unit for shifting the slips upwardly and downwardly may be located at a side of the rotary table, and may act through a yoke to engage the counterweight ring, in a manner moving it upwardly and downwardly to shift the slips.

The slips may be operatively connected together for movement upwardly and downwardly precisely in unison by means of a series of pivotal elements or levers which suspend the slips and swing upwardly and downwardly about different horizontal axes, with non-linear angle drive rotary shaft mechanisms interconnecting the various pivotal elements or levers for swinging movement in correspondence with one another. In one form of the invention, these non-linear shafts are of the universal type, while in another arrangement we employ bevel gear drives between the shafts connected to the different levers.

To enable lateral movement of the slip carrying assembly past a vertically extending pipe, there may be provided an interruption in the annular counterweight ring, at one location about the pipe, with this interruption being closed by a gate which is movable to an open position when desired. Also, the top wall or cover of the apparatus may contain a similar opening, which can be closed in the condition of use by a door connected to one of a plurality of inner removable cover elements mounted to the inside of the top cover.

Brief description of the drawings

The above and other features and objects of the invention will be better understood from the following detailed description of the typical embodiments illustrated in the accompanying drawings, in which:

FIG. 3a is a vertical section taken on line 3a—3a of FIG. 3;

FIG. 4 is a vertical section on line 4—4 of FIG. 3;

FIG. 5 is a fragmentary perspective representation of the manner of suspension and actuation of one of the pipe gripping slips;

FIG. 5a is a view on line 5a—5a of FIG. 5;

FIG. 6 is a fragmentary vertical section taken on line 6—6 of FIG. 2;

FIG. 6a is a section similar to FIG. 6, but showing a locking lug of one of the removable cover sections after it has been rotated out of locking engagement with a coacting lug on the main cover plate structure;

FIG. 7 is a fragmentary vertical section taken on line 7—7 of FIG. 2;

FIG. 8 is a fragmentary vertical section taken on line 8—8 of FIG. 3; and

FIG. 9 shows fragmentarily the manner in which universal joint type rotary drive connections can be substituted for the bevel gears of FIGS. 1 to 8.

Description of the preferred embodiments

Figure 1:
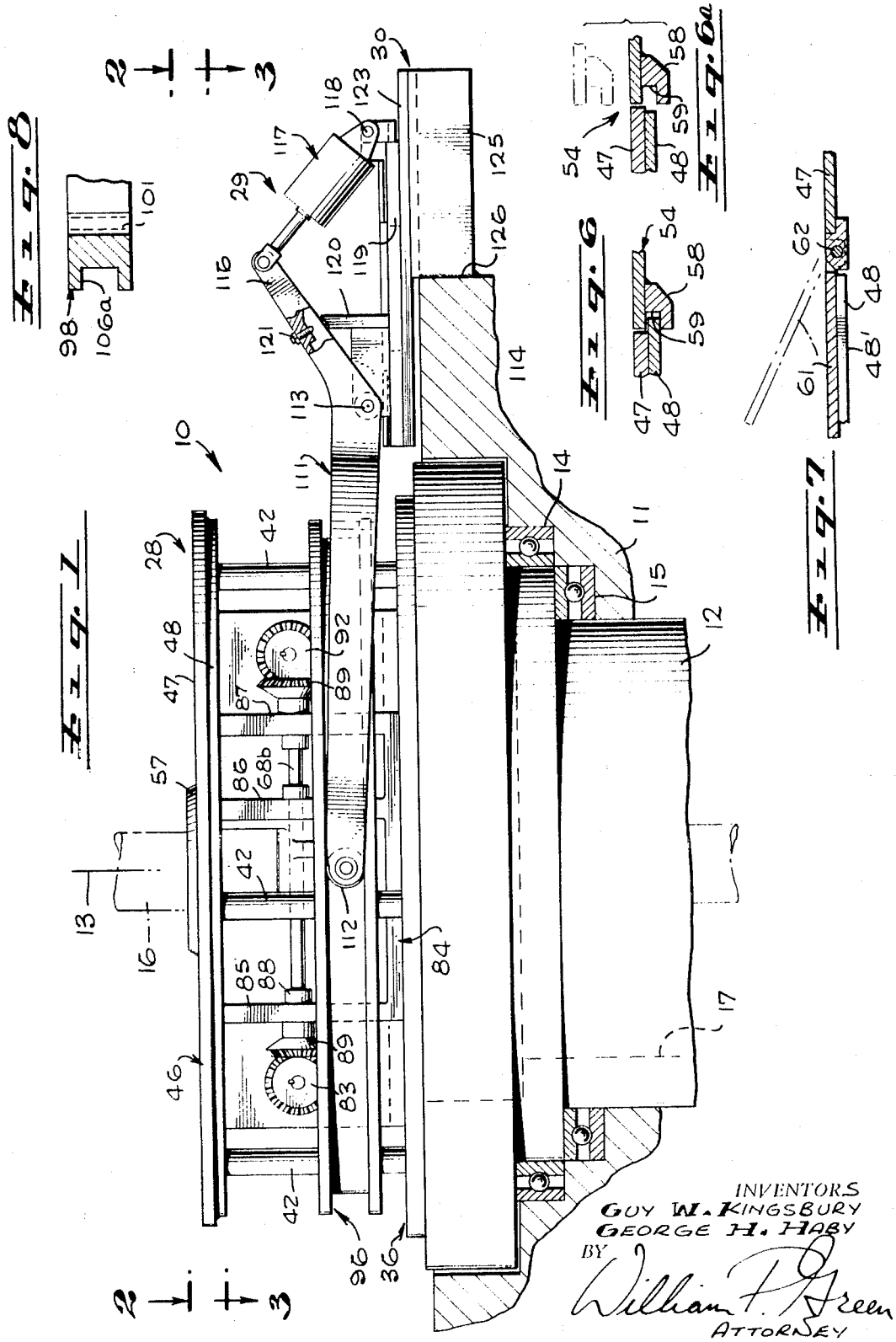
FIG. 1 is a side view of a power slip assembly constructed in accordance with the invention, showing the assembly positioned on and within the movable portion of a well drilling rotary table, but with the stationary portion of the table broken away in section.

With reference first to FIG. 1, we have illustrated generally at 10 a conventional well drilling rotary table, having a stationary portion 11 and a movable portion 12 which is power driven rotatively about the vertical axis 13 of the well. The movable section 12 of the rotary table is mounted to and supported by the stationary section 11 by appropriate centering and thrust bearings diagrammatically represented at 14 and 15. The well pipe 16 extends vertically through an opening 17 in the center of movable section 12 of the rotary table, being connectible at its upper end to the usual elevator mechanism (not shown), and extending downwardly at its lower end into the well.

As seen best in the vertical sectional view FIG. 4, the rotary table contains a master bushing structure 18, which may be any conventional type of master bushing arrangement adapted to be driven rotatably and positively by the rotary section 12 of the table. The master bushing is typically illustrated as of the one piece essentially tubular type, having an upper externally square flange portion 19 shaped to be received and confined within, and be driven rotatively by, the upper square recess 20 in the rotary table, and containing four pin drive recesses 21 formed in the four corners of the upper square portion of the master bushing and adapted to receive four downwardly projecting drive pins 22 on the power slip mechanism of the invention. Within master bushing 18, there may be provided two semi-circular complementary slip bowl segments 23, centered about tthe vertical axis 13 of the pipe, and forming downwardly tapering internal slip supporting surfaces disposed arcuately about axis 13 and having the vertical configuration illustrated in FIG. 4. These surfaces may have upper portions 24 and lower portions 25, with an inclined relatively abrupt or more horizontal step or shoulder 26 extending therebetween to engage and support correspondingly shaped surfaces on the slips. At their lower ends, the two semi-circular slip bowl segments 23 may have semi-circular bushing rings 27 forming a reduced diameter opening through which the pipe extends.

Figure 2:
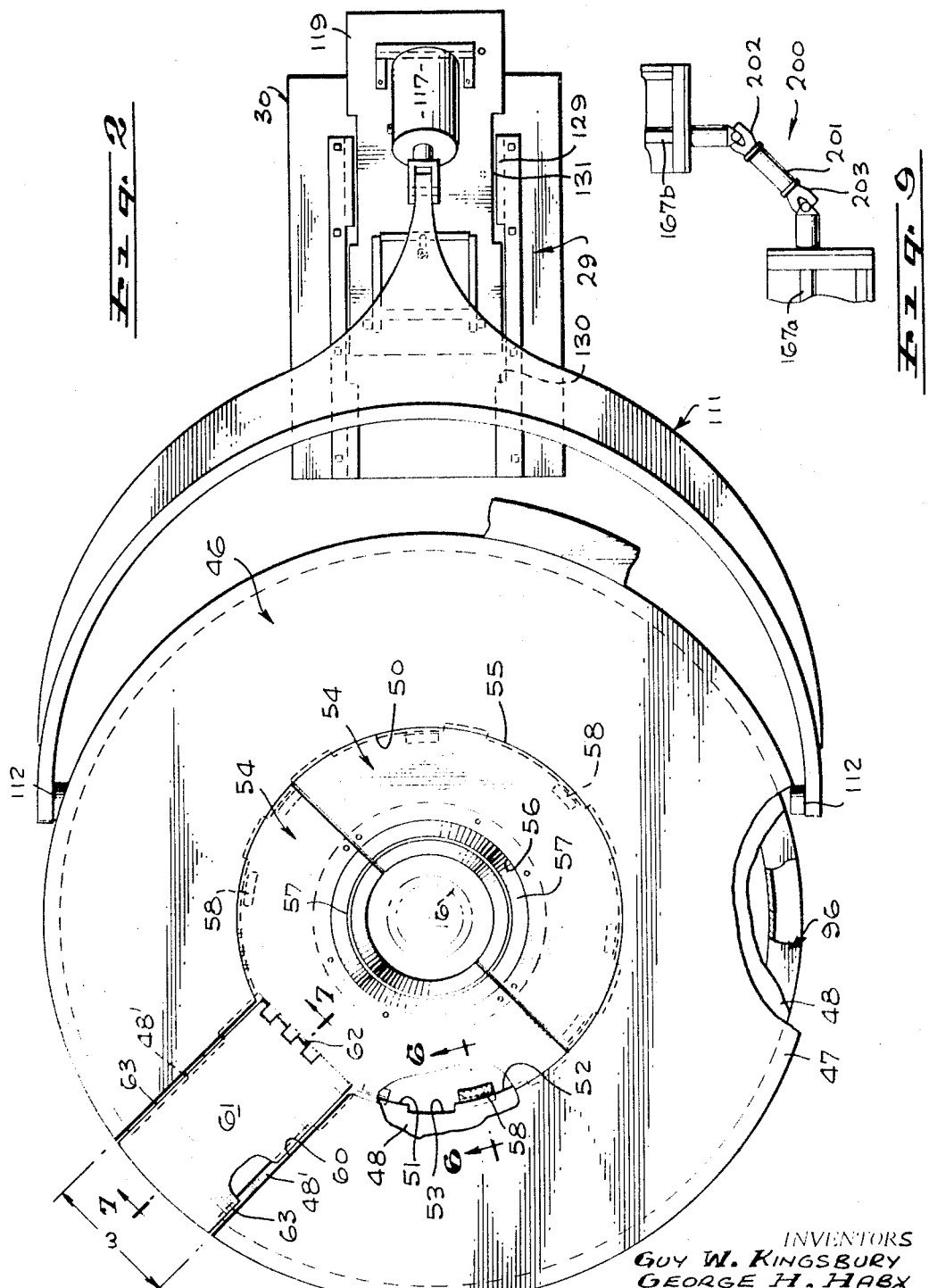
FIG. 2 is a top plan view taken on line 2—2 of FIG. 1, but showing the actuating unit retracted laterally relative to the table carried portion of the apparatus.
Figure 3:
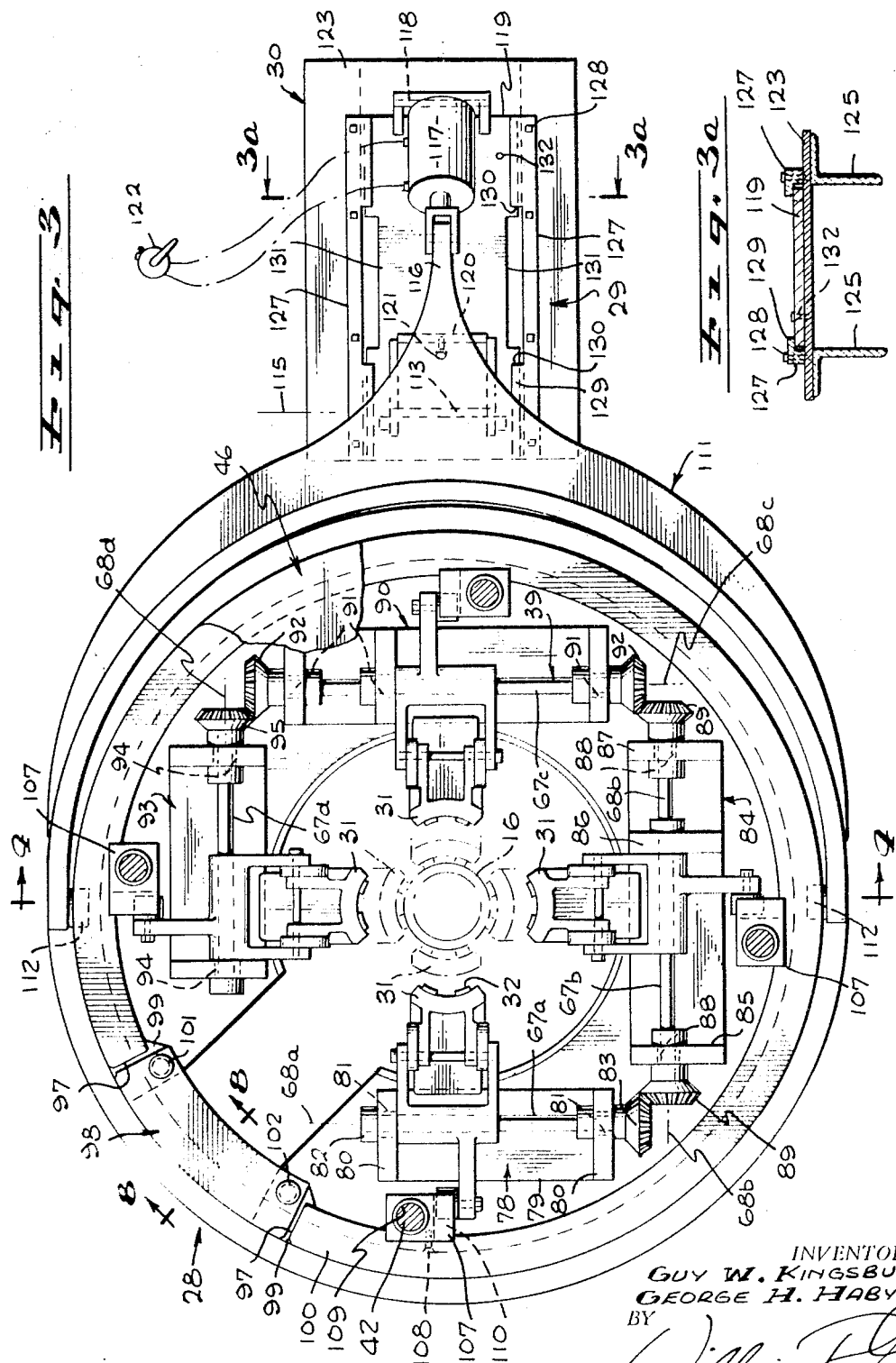
FIG. 3 is a horizontal section taken on line 3—3 of FIG. 1.

The power slip apparatus embodying the present invention includes a first section 28 which is mounted on the rotary table, and turns with the table about axis 13 of the pipe, and which is controlled by a second section or actuating unit 29 carrier by a stationary support structure 30 (FIGS. 1, 2, and 3). The rotating section 28 of the power slip includes several (desirably four) pipe gripping slips 31, which may be evenly circularly spaced about the pipe and its axis, and which have inner gripping faces 32 forming teeth curved arcuately about axis 13 and adapted to grip the outer surface of and suspend pipe 16. Externally, the slips have first arcuately curved downwardly tapering surfaces 33 (FIG. 4) shaped in correspondence with inner surfaces 24 of the slip bowl segments 23, and second and lower reduced diameter arcuately curving downwardly tapering cam surfaces 34 shaped in correspondence with and adapted to engage lower surfaces 25 of the slip bowl segments. A more abrupt inclined shoulder surface 35 is formed between the two surfaces 33 and 34, to provide an abrupt change in diameter at the location of surface 35 of each slip, so that in the upper position of the right hand slip in FIG. 4, this slip is displaceable laterally outwardly away from axis 13 far enough to avoid any interference with the pipe or its joints, and to pass a joint of the pipe upwardly or downwardly through the slips. When lowered to the broken line position of the left hand slip in FIG. 4, each of the slips is cammed inwardly by the engagement of surfaces 33 and 34 with surfaces 24 and 25, so that the gripping teeth 32 effectively engage the pipe in a relation suspending its weight from the slips and the rotary table.

In addition to the slips themselves, the rotating section 28 of the power slip mechanism includes a main body structure 36, four individual levers 37 for suspending the slips, a counterweight ring 96 for counterbalancing the weight of the slips, and rotary drive shaft connections generally indicated at 39 for maintaining the upward and downward movement of the slips in unison. To describe first of all the illustrated preferred construction of the body structure 36, it is noted that this body structure preferably includes an annular horizontal bottom wall 40 (FIG. 4) desirably formed of sheet steel or other appropriate rigid and strong material, and adapted to rest on and be supported by the upper surface 41 of the movable section 12 of the rotary table. At four evenly circularly spaced locations, the body structure includes four parallel vertically extending desirably cylindrical rigid pins or columns 42 (FIGS. 3 and 4), whose individual vertical axes 43 extend parallel to the main vertical axis 13 of the well. These pins or columns 42 may be formed of steel or other appropriate rigid material, and may be connected to the bottom plate 40 by extension of reduced diameter lower portions 44 into openings in plate 40, and by welding of these extensions within those openings as at 45 in FIG. 4.

At their upper ends, the pins or columns 42 are rigidly connected to and carry a top wall or cover 46, which may typically be formed of two annular superimposed horizontally extending plates 47 and 48 formed of steel or other sheet material suitably welded together as at 49. The inner edge 50 of top plate 47 may be annular about axis 13, while the inner edge 51 of the second plate 48 may be of the irregular but generally annular configuration illustrated in FIG. 2, to provide a series of circularly spaced radially inwardly projecting lugs 52 with notches 53 circularly therebetween. The space radially between pipe 16 and the inner edges of top plates 47 and 48 is substantially closed during use of the power slip assembly by a pair of complementary semi-circular removable cover sections 54, whose outer semi-circular edges 55 are of a diameter corresponding to, and closely fitting within internal circular edge 50 of top plate 47, and whose inner semi-circular edges 56 carry semi-circular wear-taking bushing elements 57 with an internal diameter slightly greater than the external diameter of the pipe. At their undersides, the two removable cover sections 54 have downwardly projecting connector lugs 58, which may be welded or otherwise rigidly secured to plates or sections 54, and which form with the plates radially outwardly facing arcuate notches 59 (FIGS. 4 and 6) dimensioned to exactly receive the inner edges or lugs 52 (FIGS. 2, 4 and 6) in a relation holding removable cover sections 54 in fixed positions relative to top plates 47 and 48. As best seen in FIG. 2, the lugs 58 are spaced in correspondence with notches 53 formed in inner edge 51 of plate 48, and are of a circular extent to be receivable within those notches, so that the plate may be moved downwardly in a proper circular orientation to move the lugs 58 into notches 53, in a bayonet connection relation, following which the two removable cover sections 54 may be turned through a sufficient angle (say for example about 10 degrees) about axis 13 to move the lugs 58 into the FIG. 4 interfitting relation with respect to lugs 52.

At one of its sides, the top wall 46, consisting of plates 47 and 48, may be interrupted to form a radially extending opening 60 (FIG. 2), of a radial width $w$ substantially greater than the diameter of pipe 16, to pass the pipe radially from a position within the interior of the assembly to a position radially outwardly of that assembly. At the location of this interruption or gap 60, one of the removable cover sections 54 carries a door 61, of a size to just close the interruption, and connected at its radially inner edge by a hinge 62 to the outer edge portion of the attached cover section 54, in a relation enabling the door to be swung upwardly as illustrated in FIG. 7 to a position in which it will not interfere with the limited rotary motion of the two cover sections 54 about axis 13 in detaching lugs 58 from lugs 52. When door 61 is received within interruption 60, the engagement of the opposite edges 63 of the door with the edges of the interruption prevents rotation of removable cover sections 54 relative to the main cover section 46, to thereby prevent detachment of the removable cover sections from section 46. Suitable means may be provided for preventing downward movement of door 61 beyond the plane of top plate 47, as by designing plate 48 to form two elongated lugs or support shoulders 48' (FIGS. 2 and 7) to support the edges of the door in its closed position.

The previously mentioned drive pins 22 are connected rigidly to bottom plate 40 of the body structure 36, as by extension of upward reduced diameter portions 163 of the pins (FIG. 4) into openings in plate 40, and welding of these portions to the plates. The pins 22 are externally cylindrical and centered about vertical axes 64, and are close fits within vertical cylindrical bores 21 in the master bushing, to transmit rotary motion about axis 13 from the rotary table to body structure 36.

Each of the slips is supported and actuated by an individual lever mechanism of the type illustrated at 65 in FIG. 5. Each such mechanism includes a lever 66 mounted on and rigidly connected to a horizontal shaft 67a, 67b, 67c, or 67d for swinging or pivotal movement therewith about the axis 68a, 68b, 68c, or 68d of the shaft. The lever 65 is suitably keyed to the shaft, as by a key 69 (FIG. 4). Each lever 66 has a first radially outwardly projecting arm 69 carrying a roller 70 which is mounted to turn relative to arm 69 about an axis 71 disposed parallel to the pivotal axis 68a, 68b, 68c, or 68d of the lever. At its opposite end, the lever 65 has two parallel identical radially inwardly projecting arms 72, which are connected at 73 to a pair of identical links 74, whose second ends are in turn pivoted to the upper end of the associated slip 31 at 75. The pivotal axes 76 and 77 of the connections at the upper and lower ends of links 74 are horizontal and disposed parallel to the previously mentioned axis 68a, 68b, 68c, or 68d of the associated lever.

Two of these four shafts, specifically numbers 67b and 67c, are identical and longer than the other two shafts 67a and 67d. Shaft 67a is mounted for rotation about its individual axis by a support member 78, having a lower horizontally extending portion 79 which is welded or otherwise rigidly secured to the upper side of bottom plate 40, and having two upstanding portions 80 at its opposite ends carrying bearings 81 which receive and rotatably mount the opposite end portions of the shaft. A stop shoulder 82 at one end of the shaft prevents its axial movement in one direction, while an enlarged diameter bevel gear 83 at its opposite end prevents axial movement in the other direction.

The second shaft 67b is mounted by a somewhat longer support element 84, suitably secured to bottom plate 40, and having three upstanding portions 85, 86, and 87 carrying bearings 88 journalling the shaft, with bevel gears 89 being rigidly mounted to opposite ends of the shaft 68b and retaining it against axial movement. The third shaft 68c is mounted in the same manner as shaft 67b, by a support element 90 carrying bearings 91, with bevel gears 92 mounted rigidly to the two opposite ends of the shaft. The fourth shaft 67d is similar to shaft 67a, being mounted by a support element 93 carrying bearings 94, and having a bevel gear 95 at one of its ends. As will be apparent from FIG. 3, the successive axes of the different shafts are at right angles to one another, and the bevel gears 83, 89, 92, and 95 (which are of identical sizes) connect the shafts together for rotation about their individual mutually perpendicular axes in unison, to thus assure maintenance of the counterweight ring in precisely horizontal condition.

The outer end rollers 70 carried by the various levers 65 are actuated upwardly and downwardly by the previously mentioned counterweight ring 96, so that the counterweight serves to actuate each of the various slips 31 directly through its associated lever, while at the same time counterbalancing the weight of all of the slips and their connected parts. As seen clearly in FIG. 3, ring 96 is annular about the main vertical axis 13 of the apparatus, except at the location of an interruption 97, forming an opening for passing the pipe radially outwardly from within the slip apparatus. This interruption is closed by a gate 98. which is removably connectible to a pair of lugs 99 on the opposite ends of the main section 100 of the ring by verical headed pins 101 and 102, received within registering openings in the gate and lugs.

The vertical cross section of the main portion 100 of the ring 96 will be best understood by reference to FIGS. 4 and 5, which illustrate that the ring has a vertical portion 103 and two radially outwardly projecting parallel flanges 104 and 105 defining therebetween an annular radially outwardly facing groove 106 of rectangular vertical cross section. As seen in FIG. 8, the gate 98 has similar vertical and radially outwardly projecting flange portions defining a groove 106a of the same shape as groove 106, and forming a continuation thereof, so that together the main groove 106 and gate groove 106a form a completely annular guideway of uniform cross section. At its radially inner side, the vertical wall 103 of main portion 100 of the ring carries four rigid blocks 107 (suitably rigidly secured to the ring as by screws one of which is represented at 108 in the left portion of FIG. 3). Each of these blocks contains a vertical cylindrical passageway 109 (FIG. 3) closely receiving and slidably engaging one of the verical pins or columns 42 of the body structure, so that these blocks act together to guide ring 96 for only vertical movement, while maintaining the ring against displacement from a truly horizontal orientation in any of its vertical settings. At its side, each of the blocks 107 contains a radially extending guideway 110 (FIGS. 4 and 5) having upper and lower horizontal parallel walls which are engageable with the periphery of the coacting lever carried cylindrical roller 70, in a relation confining the roller within the guideway and causing upward and downward swinging movement of arm 69 of the coacting lever in response to vertical movement of the ring. Upon such vertical movement of the ring, the roller of course moves radially of axis 13 a short distance. As seen in FIG. 5a, the vertical height of guideway 110 is perferably somewhat greater than the diameter of roller 70, to leave clearance for limited vertical movement of the roller in the guideway, for a reason to be discussed specifically at a later point in this description.

By virtue of the lever connection between ring 96 and the slips, the slips move downwardly when the ring moves upwardly, and vice versa, in a counterbalancing relation. In order to optimize this effect, the weight of portions 98 and 100 of the ring 96 should be such as to, in combination with the weight of blocks 107, lever arms 69, and rollers 70, exactly counterbalance the opposed weight of the slips 31, links 74, and arms 72 of the levers.

To describe now the actuating unit 29 for moving counterweight ring 96 upwardly and downwardly, this unit includes a yoke 111 which extends semi-circularly about one side of ring 96, and which carries two diametrically opposite rollers 112 mounted to the ends of the yoke to turn about a common horizontal axis 113 which, in the operative condition of the apparatus, extends diametrically through and intersects axis 13 of the pipe. The rollers 112 are cylindrical and of a diameter corresponding to the vertical height of grooves 106 and 106a in the counterweight ring, and are received rotatably in those grooves in a relation causing upward and downward movement of the ring in response to swinging movement of the yoke. The yoke is mounted by a shaft 113 for pivotal movement about a horizontal axis 115 (FIG. 3), and has a generally radially outwardly extending inclined outer arm 116 (FIG. 1) connected pivotally to the piston of a fluid actuated piston and cylinder mechanism 117, whose cylinder is pivotally connected at 118 to a horizontal carrier plate 119 formed of sheet metal or the like. An upstanding stop lug 120 is engageable by an adjustable screw 121 carried by arm of the yoke. The actuation of the yoke may be controlled by a suitable control valve 122 (FIG. 3), which may be of the three way valve type, capable of supplying pressure fluid to either end of the cylinder of mechanism 117, and discharging the fluid from the opposite end, and also capable of actuation ti an "off" setting in which pressure fluid is not supplied to either end of the cylinder.

The mounting plate 119 of actuating unit 29, and the parts carried thereby, including yoke 111, are mounted for horizontal sliding movement, radially of axis 13, by the previously mentioned support structure 30. This support structure (FIGS. 1 and 3) includes a horizontal plate 123, which is secured in stationary position in any suitable manner, as by welding it to a pair of horizontal parallel support rails or angle irons 125, which are in turn welded or otherwise rigidly secured to the outer surface of the stationary portion 11 of the rotary table at 126 (FIG. 1). Plate 123 carries on its horizontal planar upper surface a pair of parallel guideway elements 127 (FIGS. 3 and 3a), which may be secured to plate 123 by screws 128 or otherwise, and which extend generally radially with respect to axis 13, with these guideway elements 127 forming retaining flanges 129 spaced above the upper surface of plate 123 to define giudeways slidably receiving and guiding the opposite edges of plate 119. Flanges 129 are interrupted at 130, while the side edges of plate 119 are interrupted at corresponding locations 131, so that when the plate 119 is in the position of FIG. 3, it is effectively secured against upward removal from plate 123, but if the plate is shifted outwardly to the position of FIG. 2, the interruptions 130 and 131 in the two plates are so located as to release the edges of plate 119 from confinement with guideway elements 127, so that the plate 119 and its carried parts, including the yoke, can be completely detached upwardly from plate 123. A lock pin 132 is receivable within registering openings in the two plates 119 and 123 in the FIG. 3 position of the actuating unit, to retain the actuating unit in that setting. When the actuating unit is retraced laterally to its FIG. 2 position, the rollers 112 carried by the yoke are then outside of the grooves 106 and 106a in the counterweight ring, so that the interfitting engagement of the yoke with the ring cannot preclude further detachment of the actuating unit from the rest of the apparatus.

In using the equipment thus far described, assume first of all that the apparatus has been installed to the condition shown in FIG. 1, and that it is then desired to support pipe 16 by means of the power slip structure. This is effected by turning valve 122 of FIG. 3 to a position in which it causes piston and cylinder mechanism 117 to swing the yoke about its axis 114 in a clockwise direction as viewed in FIG. 1. This causes the left end of the yoke to swing upwardly and cause corresponding upward displacement of counterweight ring 96, to thus swing the levers from the full line position of FIG. 4 to the broken line position shown in the left portion of that figure, and to in this way lower the slips in unison to the broken line position illustarted in FIG. 4 in which the slips are cammed inwardly by slip bowl structure 23 into tight gripping engagement with the pipe. In this condition, the mechanism will support the pipe even though the movable portion 12 of the rotary table is turned about its axis, and will support the pipe continuously during such rotation, since the entire slip, lever, and counterweight assembly turns with the rotary table, and since yoke 111 is capable of continuously engaging and locating the counterweight as it turns. It is also noted that, when the slips are in this active pipe supporting position, in which the slips are supported by and rest on slip bowl segments 23, the rollers 70 at the other ends of levers 65 are preferably so located as to be spaced vertically from, and be out of contact with, both the upper and lower walls of their coacting guideway grooves 110 (see FIG. 5a), so that the rollers do not contact those walls during actual rotation of the apparatus. Stop screw 121 carried by yoke 111 (FIGS. 1 and 3) is adjusted to attain this result by halting the slip lowering swinging movement of yoke 111 when the counterweight is in the FIG. 5a setting.

When it is desired to release the pipe from support by the slips, the valve 122 is so actuated as to cause piston and cylinder mechanism 117 to swing the yoke reversely, to thereby lower the counterweight and raise the slips back to their full line positions of FIG. 4. During upward and downward movement of the counterweight and slips, counterweight ring 96 is held in a proper precisely horizontal orientation by its sliding engagement with vertical pins or columns 42, and by the drive shaft connections 67a, 83, 89, 67b, 92, etc. between the various levers 65.

FIG. 9 shows fragmentarily another form of the invention, which differs from the first form only in that a different type of non-linear rotary drive shaft connection is provided between the various slip suspending levers 65. In this FIG. 9 arrangement, instead of utilizing bevel gears as shown at 83, 89, 92, and 95, each of the shafts 167a, 167b, etc. (corresponding to shafts 67a, 67b, 67c, and 67d of FIG. 3) is connected to the next successive shaft by a conventional universal joint type of rotary drive illustrated at 200 in FIG. 9. This universal joint may include a short connector shaft 201, disposed at a 45 degree angle to the two shafts being joined, and connected by universal joints at 202 and 203 to the opposite ends of those shafts. Three such universal joint assemblies, substituted for the three bevel gear connections of FIG. 3, act to maintain rotation of the four shafts completely in unison, so that the slips move upwardly and downwardly together. Other types of non-linear angle drive shaft structures can of course be substituted for those typically shown in the drawings.

We claim:

1. A power slip assembly comprising a body structure, means for mounting said body structure to a rotary table for rotation therewith about a generally vertical axis, a plurality of pipe gripping slips, a plurality of levers suspending said slips respectively and mounted pivotally to said body structure for upward and downward swinging movement about different generally horizontal axes to raise and lower the slips, a counterweight carried by said body structure for rotation therewith about said vertical axis and connected to said levers in a relation to move upwardly when the slips move downwardly, and downwardly when the slips move upwardly, to thereby counterbalance the weight of the slips.

2. A power slip assembly as recited in claim 1, in which said counterweight is disposed essentially about said vertical axis, there being a plurality of parallel vertical guide pins carried by the body structure and guiding said counterweight for vertical movement.

3. A power slip assembly as recited in claim 1, in which said counterweight is disposed essentially about said vertical axis, there being a plurality of parallel vertical guide pins carried by the body structure and guiding said counterweight for vertical movement, a plurality of shafts turning with said levers about said different horizontal axes respectively, and non-linear rotary drive connections between circularly successive ones of said shafts to assure rotation of the shafts in unison.

4. A power slip assembly as recited in claim 3, including a powered actuating unit which does not rotate about said vertical axis and which includes a yoke interfitting with opposite sides of the counterweight to shift it vertically.

5. A power slip assembly comprising a body structure to be mounted to a rotary table, a plurality of slips movably mounted to said body structure for engaging and supporting a well pipe, a first cover section mounted to said body structure at a level above the slips and extending essentially annularly about said pipe and having an interruption at one side of the pipe to pass the pipe into and out of said assembly, a plurality of complementary additional cover sections received about said pipe and within an opening in said first cover section, and a gate movably carried by one of said additional cover sections for closing said interruption in the first section.

6. A power slip assembly as recited in claim 5, including interfitting means on said first cover section and said additional cover sections for connecting the latter to the former by relative rotary motion about the axis of the pipe.

7. A power slip assembly as recited in claim 6, including hinge means mounting said gate to said one end of the additional cover sections for upward swinging movement out of said interruption and to a position enabling said rotary motion of the additional cover sections about said axis of the pipe.

8. A power slip assembly comprising a body structure to be mounted to a rotary table, a plurality of slips movably mounted to said body structure for engaging and supporting a well pipe, a first cover section mounted to said body structure at a level above the slips and extending essentially annularly about said pipe and having an interruption at one side of the pipe to pass the pipe into and out of said assembly, a plurality of complementary additional cover sections received about said pipe and within an opening in said first cover section, and interfitting means on said first cover section and said additional cover sections for connecting the latter to the former by relative rotary motion about the axis of the pipe.

9. A power slip assembly comprising a plurality of slips for supporting a well pipe and disposed about the axis of said pipe; a counterweight; mechanism operatively connecting said slips to said counterweight in counterbalancing relation so that when the slips move in one vertical direction said counterweight moves in the opposite vertical direction; means for mounting said slips and said counterweight and said mechanism to a rotary table about said axis; and powered means for actuating said counterweight and said slips upwardly and downwardly and which do not rotate with said slips, counterweight and mechanism; said counterweight being disposed essentially about said axis and having a portion which is essentially annular about said axis and movably interfits with said non-rotating powered means for vertical actuation thereby.

10. A power slip assembly comprising a plurality of slips for supporting a well pipe and disposed about the axis of said pipe, a counterweight which is essentially a ring, mechanism operatively connecting said slips to said counterweight ring in counterbalancing relation so that when the slips move in one vertical direction said counterweight ring moves in the opposite vertical direction, means for mounting said slips and said counterweight ring and said mechanism to a rotary table for rotation with the rotary table about said axis, and a powered actuating unit for moving the counterweight ring upwardly and downwardly and which does not turn with the counterweight ring about said axis, said actuating unit including a yoke mounted pivotally to swing upwardly and downwardly and interfitting with said rotary counterweight ring at opposite sides in a relation to actuate the ring vertically while enabling rotation thereof relative to the yoke.

11. A power slip assembly comprising a plurality of slips for supporting a well pipe and disposed about the axis of said pipe, a counterweight extending substantially annularly about said axis, and mechanism operatively connecting said slips to said counterweight in counterbalancing relation so that when the slips move in one vertical direction said counterweight moves in the opposite vertical direction to at least partially counterbalance the weight of the slips.

12. A power slip assembly comprising a plurality of slips for supporting a well pipe and disposed about the axis of said pipe, a counterweight extending substantially entirely about said axis and having a gate portion at one side openable to pass said pipe therethrough, and mechanism operatively connecting said slips to said counterbalancing relation so that when the slips move in one vertical direction said counterweight moves in the opposite vertical direction to at least partially counterbalance the weight of the slips.

13. A power slip assembly comprising a plurality of slips for supporting a well pipe and disposed about the axis of said pipe, a counterweight, mechanism operatively connecting said slips to said counterweight in counterbalancing relation so that when the slips move in one vertical direction said counterweight moves in the opposite vertical direction, means for mounting said slips and said counterweight and said mechanism to a rotary table for rotation with the rotary table about said axis, and means for actuating said counterweight and said slips upwardly and downwardly and which do not rotate with said slips, counterweight, mechanism, and rotary table about said axis.

14. A power slip assembly as recited in claim 13, in which said actuating means include a power operated unit which does not turn with said slips, counterweight, mechanism and rotary table about said axis and which is operable by power to actuate said counterweight and slips upwardly and downwardly.

15. A power slip assembly comprising a plurality of slips for supporting a well pipe and disposed about the axis of said pipe, a common counterweight for said slips extending essentially about said axis, and a plurality of mechanisms operatively connecting said slips respectively to said counterweight at different locations about said axis and in counterbalancing relation so that when the slips move in one vertical direction said counterweight moves in the opposite vertical direction to at least partially counterbalance the weight of the slips.

16. A power slip assembly as recited in claim 15, including power actuated means for shifting said counterweight upwardly and downwardly and acting through said counterweight and said mechanisms to move the slips vertically.

17. A power slip assembly as recited in claim 15, in which said mechanism include a plurality of levers mounted to swing upwardly and downwardly and interconnecting said slips respectively and said common counterweight in said counterbalancing relation.

18. A power slip assembly including a plurality of slips disposed about a vertical axis and adapted to be actuated upwardly and downwardly between an active lowered position and an inactive raised position, a plurality of levers connected operatively to said slips respectively to swing upwardly and downwardly about individual different essentially horizontal axes in correspondence with the upward and downward movement of the slips respectively, a common counterweight for said slips extending essentially about said vertical axis and connected operatively at different locations to said levers respectively in a relation such that the counterweight moves upwardly when the slips move downwardly and vice versa, and a rotary drive shaft structure connected at a first location to a first of said levers to turn therewith about a first of said horizontal axes, and connected at a second location to a second of said levers a turn therewith about the second of said horizontal axes, and having a non-linear portion between said first and second locations interconnecting said levers for swinging movement in unison about said two different axes respectively to assure vertical movement of the slips in unison.

19. A power slip assembly as recited in claim 18, in which said non-linear portion of the rotary drive structure includes two bevel gears turning about said two horizontal axes respectively and meshing together in drive transmitting relation.

20. A power slip assembly as recited in claim 18, in which said non-linear portion of the rotary drive structure includes a universal drive type non-linear shaft.

21. A power slip assembly as recited in claim 18, which said levers have radially inner first ends which suspend said slips respectively and have radially outer second ends connected operatively to said common counterweight.

22. A power slip assembly including a plurality of slips for engaging and supporting a well pipe, a ring disposed about the axis of said pipe and connected to said slips to actuate them vertically and adapted to rotate about said axis with said slips, and a powered actuator which does not turn bout said axis with said slips and ring and which interfits with said ring in a relation to actuate it upwardly and downwardly, said rotatable ring having a first section forming the major portion of the circular extent of the ring but having an interruption at one side of the pipe, and a gate section completing the ring at said side but openable to pass the pipe into and out of the ring, said gate section of the rotatable ring being engageable with the non-rotating actuator in interfitting relation at said interruption.

23. A power slip assembly comprising a plurality of slips for gripping a vertical pipe, a structure extending essentially about the axis of said pipe for moving the slips upwardly and downwardly, a powered actuator unit including a yoke engageable with said structure in interfitting relation to move the structure upwardly and downwardly, said yoke being movable into and out of said interfitting relation with respect to said structure by essentially horizontal movement, a support, and a connection mounting said actuating unit to said support for essentially horizontal sliding movement toward and away from said axis in a relation moving said yoke into and out of said interfitting relation with respect to said structure.

24. A power slip assembly as recited in claim 23, in which said connection includes sliding guideway parts which are detachable from one another in a laterally retracted position of the actuating unit to free said unit for complete separation from the support.

25. A power slip assembly comprising a plurality of slips for gripping a vertical pipe; a structure extending essentially about the axis of said pipe for moving the slips upwardly and downwardly; a powered actuating unit including a yoke engageable with said structure in interfitting relation to move the structure upwardly and downwardly, a support, a pivotal connection between said support and said yoke mounting the latter to swing upwardly and downwardly about a horizontal axis to raise and lower the slips, and a power unit carried by said support for pivoting said yoke about said horizontal axis; and a mounting structure forming an essentially horizontal guide mounting said support and said yoke, pivotal connection and power unit for bodily generally horizontal sliding movement toward and away from said axis of the pipe between a first position in which said yoke is in interfitting relation with said first mentioned structure and a retracted position out of said interfitting relation.

26. A power slip assembly as recited in claim 25, in which said guide is constructed to free said support for upward detachment therefrom when the support is in said retracted position.

27. A power slip assembly comprising a plurality of slips for supporting a well pipe and disposed about the axis of said pipe, a counterweight, mechanism operatively connecting said slips to said counterweight in counterbalancing relation so that when the slips move in one vertical direction said counterweight moves in the opposite vertical direction, and means for mounting said slips and said counterweight and said mechanism to a rotary table for rotation with the rotary table about said axis, said last mentioned means including positive drive means engageable with said rotary table in a relation positively retaining said slips, counterweight and mechanism in fixed rotary position relative to the rotary table and thereby driving said slips, counterweight and mechanism positively about said axis with the rotary table.

References Cited

UNITED STATES PATENTS

| | | | |
|---|---|---|---|
| 1,195,906 | 8/1916 | Brown | 24—263.5 |
| 1,731,128 | 10/1929 | Edwards. | |
| 1,788,542 | 1/1931 | Page. | |
| 1,883,073 | 10/1932 | Stone | 24—263.5 |
| 1,997,731 | 4/1935 | Humason | 24—263.5 XR |
| 2,068,217 | 1/1937 | Abegg | 24—263.5 |
| 2,340,597 | 2/1944 | Kelley. | |
| 2,641,816 | 6/1953 | Liljestrand. | |
| 2,810,552 | 10/1957 | Martin. | |
| 2,896,292 | 7/1959 | Kinzbach. | |
| 3,149,391 | 9/1964 | Boster | 24—263.5 |

DONALD A. GRIFFIN, Primary Examiner

U.S. Cl. X.R.

175—195